2,228,456

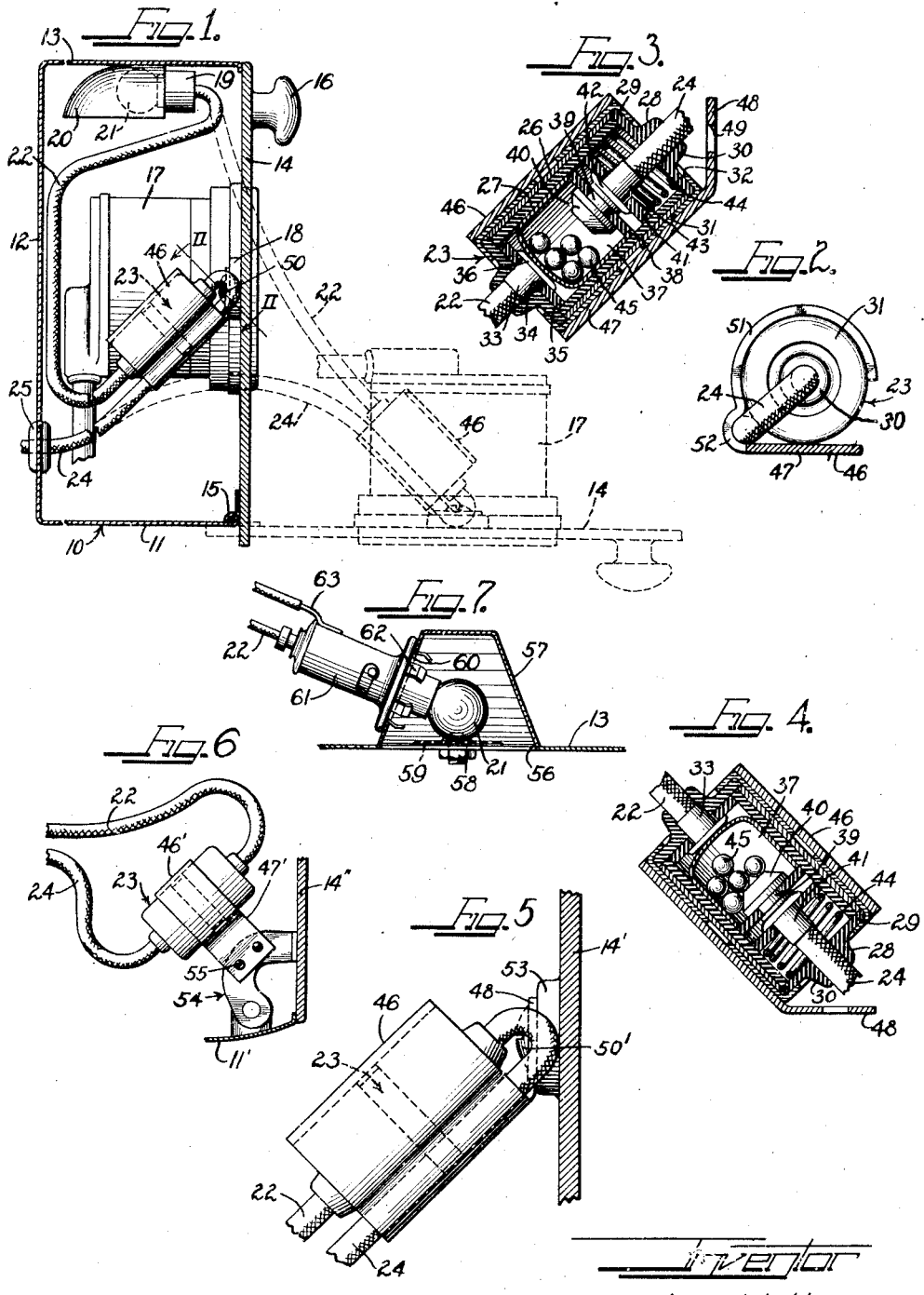
Jan. 14, 1941. J. W. HOBBS 2,228,456
AUTOMOBILE COMPARTMENT LIGHT
Filed June 26, 1939
Inventor
JOHN W. HOBBS Patented Jan. 14, 1941

UNITED STATES PATENT OFFICE 2,228,456

AUTOMOBILE COMPARTMENT LIGHT

John W. Hobbs, Springfield, Ill., assignor to John W. Hobbs Corporation, Springfield, Ill., a corporation of Delaware Application June 26, 1939, Serial No. 281,139

1 Claim. (Cl. 240—2)

The present invention relates in general to the lighting of compartments, and is more particularly concerned with improved means for the lighting of storage compartments in a vehicle, particularly compartments on the dash of the vehicle such as may be utilized for the storage of miscellaneous articles such as road maps, gloves and etcetera.

It is an object of the present invention to provide improved compartment lighting means which may be turned on and off by the movement of a hinge closure or door of the compartment, and in which the illuminating source is so positioned as to not only illuminate the compartment, but also provide illumination exteriorly thereof for other purposes. For example, when the arrangement is utilized for a compartment on the vehicle dash, ample light is available for reading road maps and the like.

A further object of the herein described invention is to provide improved compartment lighting means embodying a novel switching device for the illuminating source energizing circuit, this device being arranged for mounting on the compartment closure or door for movements therewith and having gravitationally responsive contacts for closing and opening the control circuit in response to movements of the closure.

A still further object is to provide improved compartment lighting means controlled by movements of a hinged closure or door of the compartment, and in which a gravity actuated control switch may be mounted on the closure or door, but in which the illuminating source is separately mounted from the switch so that it is not necessary in circuits having one side grounded to carry the ground circuit through the door hinge structure.

Another object is to provide an improved mounting for the switch device, which also serves as a wire support for certain of the circuit conductors connected with the switch.

Still another object is to provide in connection with storage compartment lighting means, a gravitationally actuated switch of improved simple construction, which is highly efficient in operation, easily mounted for tilting movements, and which will operate over long periods of use without giving trouble.

The above, further and other objects of the present invention will be apparent from the following description and accompanying drawing.

The accompanying drawing illustrate an embodiment of the present invention as well as several alternative arrangements of parts, and the views thereof are as follows:

Figure 1 is an elevational view partly in section showing the invention applied to a storage compartment such as might be utilized on the dash of an automotive vehicle. In this embodiment, it will be noted that the compartment door closure is utilized for supporting a clock and that the control switch for the lighting means is mounted in proper position on the securing lug of the clock. In the full line position of the parts as illustrated the control switch is open, and in the dotted line position the parts of the control switch are closed to complete the circuit to the illuminating source which is placed in such position as to not only direct its rays to the interior of the compartment, but also direct a large proportion of its rays through the door opening to the exterior of the compartment for utilization in reading road maps, and for other purposes.

Figure 2 is an enlarged detailed view, partly in section, illustrating the construction of the switch supporting bracket, and the manner in which it is utilized to support certain of the conductors connected with the switch, taken substantially on line II—II of Figure 1.

Figure 3 is an enlarged axial sectional view through the illustrated form of switch, showing the relationship of the switch parts, when the switch is tilted to inoperative or "off" position.

Figure 4 is a view similar to Figure 3, with the switch tilted to "on" position, showing the relationship of the parts where the circuit of the illuminating means is closed by the gravitationally responsive means forming a part of the switch.

Figure 5 is an enlarged fragmentary view showing a different mounting arrangement of the switch on a compartment door. This arrangement is suitable where a clock is not carried by the door.

Figure 6 shows still another mounting arrangement for the switch, wherein the switch is mounted on one of the hinge members of the compartment door.

Figure 7 is an enlarged fragmentary view, partly in section, illustrating an alternative arrangement of illuminating means and reflector therefor in a storage compartment. This arrangement permits utilization of larger lamps, facilitates replacement of the lamps, and provides greater space within the compartment.

As shown on the drawing:

For illustrating the present invention, there is shown in Figure 1, a storage compartment as generally indicated at 10 such as frequently is utilized on the dash of an automotive vehicle for the storage of gloves and the like. This compartment comprises a bottom wall 11, back wall 12 and top wall 13. The forward wall of the compartment is provided with a door 14 permitting of access to the compartment. This door is usually hinged at its bottom as shown at 15 for swinging to open and close positions, which may be accomplished by means of a suitable knob 16 attached adjacent the upper edge of the door.

Not infrequently, this door serves as a mounting for a clock as shown at 17, suitable mounting lugs 18 being provided on the clock casing for securing the clock with the major portion of its casing extending rearwardly of the door and a portion of the end of the casing projecting through a suitable opening in the door and extending forwardly of the forward face of the door so that the clock face will be visible by car occupants without opening the compartment door.

Compartments such as just described are very often quite deep and unless auxiliary means are provided for illuminating these compartments, it is quite difficult to find articles in the compartment without having to remove them from the compartment. The present invention is chiefly concerned with the provision of such illuminating means and the arrangement of novel control elements for the illuminating means, the control elements being so arranged that they will function automatically to turn the illuminating means on and off in response to opening and closing of the door 14 of the compartment.

In the arrangement shown in Figure 1, there is provided a suitable receptacle 19 having a reflector 20 associated therewith and connected in any suitable manner to one of the compartment walls. The receptacle 19 is arranged to removably receive an illuminating source such as a small electric lamp 21. The receptacle and associated reflector may be mounted in any desired location within the compartment, but it is preferred that it be so mounted that light rays emanating from the lamp will not only illuminate the interior of the compartment, but will also pass through the forward side of the compartment when the door 14 is in open position, thus illuminating the space exteriorly in the front of the compartment, so that the vehicle occupants may readily read a road map or utilize the light rays from the lamp 21 for other purposes.

In the customary arrangement, one side of the lamp 21 is completed to a source of electrical energy, such as a battery (not shown), by a ground return. The other side of the lamp is supplied through an insulated circuit which may be formed as by suitable conductor 22 connecting the socket 19 with the switching device 23 from whence the circuit is carried through a hot conductor 24 to the other terminal of the electric source. The hot conductor may be connected to the clock electric terminal connection, or if desired, the hot conductor may be led through the compartment wall, a suitable grommet 25 being provided to insulatingly support the conductor in the wall.

As shown in Figures 3 and 4, the switching device 23 comprises a metallic tubular shell 26 having an interior lining 27 of suitable insulating material, the metallic shell and insulating lining being of the same length so that their ends will be flush. Each end of the shell and lining is closed by an insulating member 28 having a relatively thin circumferentially extending flange portion 29 having its inner face margin abutting the associated ends of the metallic tubular shell and its insulating lining. At its center, the member 28 is provided with an elongate sleeve portion 30 which projects outwardly and forms a support for the conductor 24 at one end, and the conductor 22 at the other end of the switching device.

The members 28 at each end of the shell 26 are held in assembled relation therewith by metallic end caps 31 having a press fit engagement with the associated end of the shell 26. Each end cap is provided at its closed end with a suitable opening 32 to permit the passage of the sleeve portion 30 of member 28 therethrough in spaced relation.

The conductor 22 extends through the sleeve portion of its associated member 28 and is provided with a contact 33 which extends through a central opening 34 in an insulating washer 35 having its peripheral edge disposed within the adjacent end of the insulating lining 27. This contact has a head portion 36 extending outwardly over the inner surface of the washer 35. The washer 35 is free for axial movements within the insulating lining member 27.

A cup-shaped member 37 is housed within the insulating lining member 27 with its bottom disposed to engage the head portion of the contact 33. The member 37 is slidably movable axially of the member 27.

Extending over the open end of the container 37 is a disk 38 of suitable insulating material, this disk having its peripheral edge in sliding engagement with the inner surface of the insulating member 27 and mounting at its center a metallic contact member 39.

It will be noted that the contact member 39 extends to both sides of the disk 38 and that on the side thereof facing the chamber, there is provided a truncate-conical head portion 40 which extends into the open end of the cup-shape member 37. The other end of contact member 39 is beaded over the opposite face of the disk 38 to retain the contact member against removal from the disk.

Adjacently disposed to the disk 38 is a second insulating disk 41 which is likewise positioned with its peripheral edge in sliding engagement with the interior wall of the tubular insulating member 37. This disk also supports a contact member at its center, one end of the contact being provided with a head portion 42 adapted to make engagement with the adjacent end of contact member 39. The other end of the contact member extends from the head portion 42 to define a stem 43 which is secured to an end of the conductor 24, this conductor extending through and being supported in the sleeve portion 30 of the adjacent member 28. As thus supported the conductor 24 may be moved axially.

Surrounding the stem portion 41 and the connected end of conductor 24 is a coiled spring 44 having one end bearing against the flanged portion 29 of member 28 and its other end bearing against the insulating disk 41. This spring acts to normally bias and resiliently retain the cup-shape member 37 and contact 33 in pressure engagement, and the contact member 39 in pressure engagement with the head portion 42 of the contact secured to the end of conductor 24.

The cup-shaped member 37 contains a plurality of gravitationally responsive conductor elements 45, such as conducting balls, which are adapted under tilting movement of the switching device to assume positions out of contact with the head 40 or in contact therewith, for disconnecting and connecting a circuit between conductors 22 and 24. More specifically, as shown in Figure 3 the switching device is disposed at an angle such that the balls 45 will gravitate to the bottom of the cup-shaped member 37, in which position the balls are out of contact with the head 40. This is the open position of the switch. In Figure 4, which is the closed position of the switch, the switch is tilted to such position that the balls gravitate into engagement with the head 40 and also contact the cup-shaped member 37 to close a circuit through the switch.

It will be evident from the foregoing description that the switching device just described may be advantageously utilized for controlling the illuminating source within the compartment 10 by mounting the switching device so that it will be tilted in response to the opening and closing movements of the compartment door 14. This may be accomplished in a variety of ways.

As shown in Figure 1, where a clock is mounted in the compartment door by means of suitable lugs 18, the switching device may be secured in proper angularly disposed position for movement with the door 14 by means of a mounting clip or bracket 46. This bracket comprises an elongate metal strip 47 having an angularly deflected end 48 which is apertured as shown at 49 for receiving a screw 50, this screw being the same screw that is utilized for securing one of the clock mounting lugs to the door 14.

As clearly shown in Figure 2, the strip 47 is laterally extended on one side and curved to form an arcuate portion 51 which may be disposed around and contact the outer surfaces of the end caps 31—31.

In order to facilitate the mounting of the switching device and the making of electrical connections thereto, the conductor 24 is led back towards the other end of the switching device and supported in position between the switching device and the inner end portion of the arm 51 by means of a channel portion 52 extending transversely of the arm.

In installations, where there is no clock mounted in the compartment door, the door may be constructed with an integrally formed pad portion 53 on its inner face, as shown in Figure 5. The mounting bracket 46 in this case has its deflected end 48 secured against the face of pad 53 as by a suitable screw 50'.

In other installations, the hinge construction for the door 14 may be arranged as generally shown at 54 in Figure 6. With this hinge arrangement, the supporting bracket or clip may have one end curved longitudinally of the strip 47' to enable attachment of the bracket as by screws 55 directly to the movable portion of the hinge instead of to the door proper.

While the illuminating means and reflector therefor are usually mounted within the compartment as shown in Figure 1, in some installations it may be found desirable to use a slightly different arrangement so as to facilitate the use of a larger lamp as well as provide more space within the compartment. Such arrangement is shown in Figure 7. In general, in this arrangement, it will be noted that the lamp, reflector and lamp socket are disposed outside the compartment. In other words, a wall of the compartment, in this instance the upper wall 13 is provided with a suitable opening 56. A cup-shaped reflector 57 is disposed within its open end over the opening 56, and the reflector secured in position by means of suitable mounting bolts 58 passing through mounting lugs 59 formed on the reflector. This reflector has in its wall portion an opening 60 for receiving a lamp socket assembly 61, which may be mounted with its socket end extending through the opening 61 into the reflector. The socket assembly is removably held in position by a plurality of spring tongues 62 which engage the periphery of the opening 60. It will be noted that the opening 60 is of sufficient size to permit withdrawal of the lamp 21 therethrough when the socket assembly is removed, thus facilitating replacements of the lamp. The connection end of the socket assembly, when mounted on reflector, is disposed outside of the reflector. In installations where a ground return is not utilized a return conductor 63 may be soldered or otherwise secured to the metallic casing of the socket assembly. It will be appreciated that with the arrangement just described, the conductor 22 will be carried to the exterior of the compartment either through a separate grommet or the grommet 25 may be of such size as to accommodate both conductors 22 and 24.

From the foregoing description it will be apparent that the present invention provides improved means for the lighting of storage compartments in vehicles, particularly compartments on the dash of the vehicle in which the illuminating source is positioned not only to illuminate the compartment, but also provide general illumination exteriorly of the compartment, when the compartment door is opened; which embodies novel switching means for controlling the illuminating source energizing circuit in response to opening and closing movements of the compartment door; in which the illuminating source is separately mounted from the control switch means so that it is not necessary in circuits having one side grounded to carry the ground circuit through the door hinge structure; which includes novel mounting means for the switching device that also serves as a wire support for certain of the circuit conductors connected with the switching means; and in which the parts are of simple construction, efficient in operation, easily mounted, and which will operate over long periods of use without giving trouble.

The invention has been described herein more or less precisely as to details, yet it is to be understood that the invention is not to be limited thereby, as changes may be made in the arrangement and proportion of parts, and equivalents may be substituted without departing from the scope and spirit of the invention.

I claim as my invention:

Lighting means for closed compartments having a tiltable closure member, said means comprising a casing, a door on said casing adapted to rotate about a horizontal axis, a source of light mounted on a wall of said casing and within said casing, a gravity-actuated switch in circuit connection with said light source, said switch including an elongated tubular casing and including movable circuit closing means enveloped by said tubular casing, an elongated clip mounted on said closure member and projecting inwardly of said casing, said switch casing being disposed within and held by said clip, said clip having a bent portion cooperating with said switch casing to define a channel, and an insulated conductor in circuit with said light source and said switch and having a portion disposed in said channel and protected by said clip.

JOHN W. HOBBS.